United States Patent
Saini et al.

(12) 
(10) Patent No.: US 12,142,059 B2
(45) Date of Patent: Nov. 12, 2024

(54) SYSTEM AND METHOD FOR DYNAMIC DIMENSIONING OF VEHICLE AND TRAILER FROM SHADOW PROFILING

(71) Applicant: GM GLOBAL TECHNOLOGY OPERATIONS LLC, Detroit, MI (US)

(72) Inventors: Utkarsh Saini, Pickering (CA); Steffen P Lindenthal, Oshawa (CA); Sai Vishnu Aluru, Commerce Twpl., MI (US); Sravan Daruri, Walled Lake, MI (US); Norman J Weigert, Whitby (CA); Fred W Huntzicker, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 386 days.

(21) Appl. No.: 17/806,023

(22) Filed: Jun. 8, 2022

(65) Prior Publication Data
US 2023/0401872 A1    Dec. 14, 2023

(51) Int. Cl.
*G06K 9/00* (2022.01)
*A61K 35/12* (2015.01)
*B60W 40/09* (2012.01)
*G06V 20/58* (2022.01)

(52) U.S. Cl.
CPC ............ *G06V 20/58* (2022.01); *B60W 40/09* (2013.01); *B60W 2420/403* (2013.01); *B60W 2540/30* (2013.01)

(58) Field of Classification Search
CPC .......... G06K 9/00; A61K 35/12; G06V 20/58
USPC ....... 382/100, 103, 104, 106–107, 122, 154, 382/155, 165, 168, 173, 181, 199, 206, 382/224, 254, 276, 286–291, 305, 312; 707/17.017; 348/148
See application file for complete search history.

(56) References Cited

U.S. PATENT DOCUMENTS

| | | | |
|---|---|---|---|
| 8,699,754 B2* | 4/2014 | Zhang | G06V 20/588 348/148 |
| 2010/0098295 A1* | 4/2010 | Zhang | G08G 1/167 348/148 |
| 2010/0310182 A1* | 12/2010 | Kroepfl | G06V 10/462 707/E17.017 |
| 2022/0126853 A1* | 4/2022 | Murad | G06T 5/50 |
| 2022/0277163 A1* | 9/2022 | Stenneth | G06T 7/12 |
| 2022/0292543 A1* | 9/2022 | Henderson | G06Q 30/0252 |
| 2023/0021369 A1* | 1/2023 | Coombs | G01G 19/10 |

* cited by examiner

*Primary Examiner* — Seyed H Azarian
(74) *Attorney, Agent, or Firm* — Lorenz & Kopf LLP

(57) ABSTRACT

A dimension calculation system in a host vehicle for dynamically calculating a vehicle dimension using solar shadow information is disclosed. The system is configured to: calculate solar position and an expected vehicle shadow based on geocode location, time and vehicle dynamics; detect an actual vehicle shadow in an image from a vehicle camera; compare the actual vehicle shadow to an expected vehicle shadow; determine a dimension profile and max height point for a vehicle plus vehicle cargo based on a comparison of the actual vehicle shadow to the expected vehicle shadow; calculate a confidence level for the dimension profile and max height point for the vehicle plus cargo; and use the dimension profile and max height point to provide one or more dimension notifications when the confidence level for the dimension profile and max height point for the vehicle plus cargo are above a first threshold level.

20 Claims, 7 Drawing Sheets

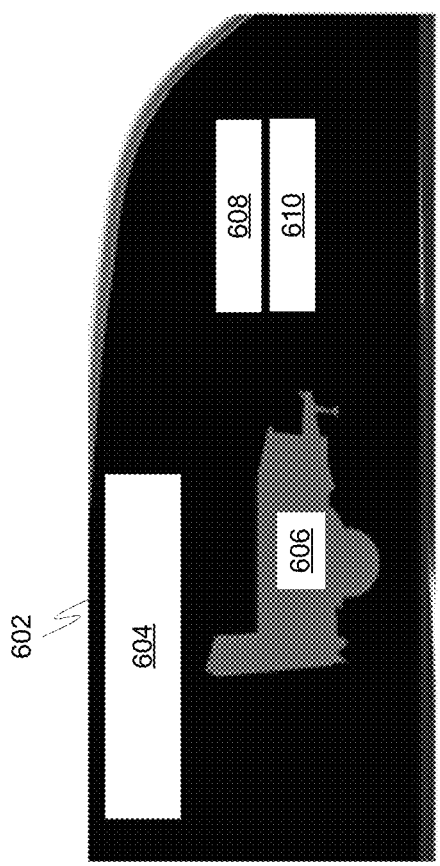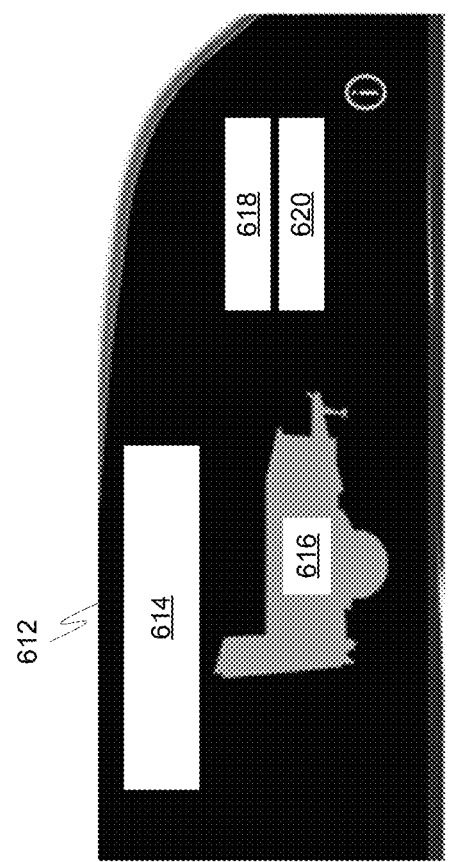

SYSTEM AND METHOD FOR DYNAMIC DIMENSIONING OF VEHICLE AND TRAILER FROM SHADOW PROFILING

INTRODUCTION

The technical field generally relates to systems, methods, and apparatuses for providing driver assistance and more particularly relates to systems, methods, and apparatuses for estimating a vehicle and/or trailer dimension (e.g., height, length, and/or width) during driving operations and making the same available to a vehicle driver.

The dimensions of cargo loaded on top of a vehicle and/or the dimensions of a trailer hitched to a vehicle may be difficult for a vehicle operator to ascertain. For example, the top of cargo may be difficult to reach, and vehicle and/or trailer camera systems may not have a clear view of vehicle/trailer height. Not knowing the dimensions, especially height, can be problematic particularly when the vehicle with the cargo and/or trailer is driven in a dimension-restricted area, such as some parking garages, bridges, and others. Driving a vehicle with excess height due to cargo and/or a trailer can result in unexpected collisions with road furniture or may simply not provide a user friendly interface for vehicle applications requiring vehicle dimensions (such as a trailering app).

It is therefore desirable for improved methods, systems, and apparatuses for estimating a vehicle and/or trailer dimension. Furthermore, other desirable features and characteristics of the present disclosure will become apparent from the subsequent detailed description and the appended claims, taken in conjunction with the accompanying drawings and the foregoing technical field and background.

The information disclosed in this introduction is only for enhancement of understanding of the background of the present disclosure and therefore it may contain information that does not form the prior art that is already known in this country to a person of ordinary skill in the art.

SUMMARY

Disclosed herein are a vehicle, methods, and systems for calculating vehicle dimensions (e.g., height, length, and/or width) using shadow information. In one embodiment, a dimension calculation system in a host vehicle for dynamically calculating a vehicle dimension using solar shadow information is disclosed. The dimension calculation system includes a controller. The controller is configured to: calculate solar position and an expected vehicle shadow based on geocode location, time and vehicle dynamics; detect one or more actual vehicle shadows in one or more images from vehicle cameras; compare the one or more actual vehicle shadows to one or more expected vehicle shadows; determine a dimension profile and max height point for a vehicle plus vehicle cargo based on a comparison of one or more actual vehicle shadows to the one or more expected vehicle shadows; calculate a confidence level for the dimension profile and max height point for the vehicle plus cargo; and use the dimension profile and max height point to provide one or more dimension notifications when the confidence level for the dimension profile and max height point for the vehicle plus cargo are above a first threshold level.

In one embodiment of the dimension calculation system, the controller is further configured to calculate the confidence level for the dimension profile and max height point for the vehicle plus cargo based on: how many observed shadows are used to determine the dimension profile and max height point, how many different vehicle travel directions are represented by the observed shadows, and magnitude and intensity of the observed shadows.

In one embodiment of the dimension calculation system, the controller is further configured to store the dimension profile and max height point for a vehicle plus vehicle cargo to accelerate future calculations when the confidence level for the dimension profile and max height point for the vehicle plus cargo is higher than the first threshold level.

In one embodiment of the dimension calculation system, the controller is further configured to: calculate an expected trailer shadow based on geocode location, time and vehicle dynamics; detect one or more actual trailer shadows in one or more images from vehicle cameras; compare the one or more actual trailer shadows to one or more expected trailer shadows; determine a dimension profile and max height point for a trailer based on a comparison of one or more actual trailer shadows to the one or more expected trailer shadows; calculate a confidence level for the dimension profile and max height point for the trailer; and use the dimension profile and max height point for the trailer to provide one or more dimension notifications when the confidence level for the dimension profile and max height point for the trailer are above a second threshold level.

In one embodiment of the dimension calculation system, the controller is further configured to calculate the expected trailer height from a given shadow using trailer width (if known) and length (if known) as a reference.

In one embodiment of the dimension calculation system, the controller is further configured to calculate the confidence level for the dimension profile and max height point for the trailer based on: how many observed shadows are used to determine the dimension profile and max height point for the trailer, how many different trailer travel directions are represented by the observed shadows, and magnitude and intensity of the observed shadows.

In one embodiment of the dimension calculation system, the controller is further configured to store the dimension profile and max height point for the trailer to accelerate future calculations when the confidence level for the dimension profile and max height point for the trailer is higher than the second threshold level.

In one embodiment of the dimension calculation system, to calculate the confidence level for the dimension profile and max height point, the controller is configured to: determine a level of illumination (e.g., image brightness) from an image histogram of an image; stretch the image histogram to maximize contrast (e.g., shadow enhancement), wherein histogram stretching involves modifying brightness (e.g., intensity) values of pixels in the image according to a mapping function that specifies an output pixel brightness value for each input pixel brightness value; calculate a level of contrast in shadow portions of the image (used as a measurement of shadow quality (1 sample)) based on the image histogram being stretched; repeat the determine a level of illumination, stretch the image histogram, and calculate the level of contrast for a predetermine number of times for a major travel direction; calculate a shadow quality measurement including a mean and variance for the level of contrast for the major travel direction after the predetermined number of times; and determine the shadow quality measurement for each of a plurality of major travel directions (N, NE, E, SE, S, SW, W, NW) the vehicle has driven in, wherein the vehicle confidence level is based on the shadow quality measurement and the directions travelled.

In one embodiment of the dimension calculation system, the controller is further configured to calculate a dimension profile and max height point for a vehicle plus vehicle cargo and/or a trailer from shadows formed from artificial light (such as streetlights at night).

In one embodiment of the dimension calculation system, to calculate a dimension profile and max height point for a trailer from shadows formed from artificial light the controller is configured to: estimate an expected vehicle shadow at a first position; detect an actual vehicle shadow from artificial light at the first position via image detection operations on an image of the vehicle; calculate a dimension scaling factor based on a difference between the expected vehicle shadow and the actual vehicle shadow; retrieve images containing a trailer shadow when the trailer is at the first position (e.g., as determined based on vehicle odometry); estimate a dimension profile and max height point for the trailer using the scaling factor; calculate a confidence level for the dimension profile and max height point for the trailer; and use the dimension profile and max height point for the trailer to provide one or more dimension notifications when the confidence level for the dimension profile and max height point are above a third threshold level.

In one embodiment of the dimension calculation system, the controller is configured to calculate the confidence level for the dimension profile and max height point for the trailer based on: vehicle dynamics, magnitude and intensity of the observed shadows, and confidence in vehicle dimensions (e.g., previously observed or not).

In one embodiment of the dimension calculation system, to calculate the confidence level of the dimension profile and max height point for the trailer, the controller is configured to: determine a level of illumination (e.g., image brightness) from image histogram of an image; stretch the image histogram to maximize contrast (e.g., shadow enhancement), wherein histogram stretching involves modifying brightness (e.g., intensity) values of pixels in the image according to a mapping function that specifies an output pixel brightness value for each input pixel brightness value; calculate a level of contrast in shadow portions of the image (e.g., used as a measurement of shadow quality (e.g., 1 sample)) based on the image histogram being stretched; repeat the determine a level of illumination, stretch the image histogram, and calculate the level of contrast for a predetermine number of times for a major travel direction; calculate a shadow quality measurement including a mean and variance for the level of contrast for the major travel direction after the predetermined number of times; and determine the shadow quality measurement for each of a plurality of major travel directions (e.g., N, NE, E, SE, S, SW, W, NW) the vehicle has driven in, wherein the vehicle confidence level is based on the shadow quality measurement and the directions travelled.

In one embodiment of the dimension calculation system, the controller is further configured to store the dimension profile and max height point for the trailer to accelerate future calculations when the confidence level for the dimension profile and max height point for the trailer is higher than a threshold level.

In one embodiment of the dimension calculation system, the controller is further configured to calculate the dimension scaling factor based on a difference between a known reference area on the vehicle and its shadow.

In one embodiment of the dimension calculation system, the known reference area includes a vehicle bumper, vehicle roof, vehicle hood, or vehicle trunk.

In one embodiment of the dimension calculation system, the one or more dimension notifications includes: a message on a navigational display that provides a message indicating a possible obstruction.

In one embodiment of the dimension calculation system, the one or more dimension notifications includes a symbol representative of a dimension-restricted item on a graphical user interface (GUI) and an indication on the GUI as to whether the dimension-restricted item poses a problem based on the estimated dimension profile and max height point.

In one embodiment of the dimension calculation system, the symbol representative of a dimension-restricted item provides an indication as to whether the dimension-restricted item poses a problem based on a color in which the symbol is displayed.

In one embodiment of the dimension calculation system, the one or more dimension notifications includes a graphical indication that includes a text box that provides estimated dimensions, a symbol that is representative of the object to which the dimensions pertain and displayed in a color that indicates a confidence level for the estimated dimensions, a button for accepting the estimated dimensions, and a button for declining the estimated dimensions.

In one embodiment of the dimension calculation system, the controller is further configured to initiate a request to vehicles in proximity to the host vehicle to retrieve dimensions determined based on shadows.

In one embodiment of the dimension calculation system, the controller is further configured to determine dimensions for another vehicle based on shadows.

In another embodiment, a vehicle is disclosed. The vehicle includes one or more cameras and a controller. The controller is configured to: calculate solar position and an expected vehicle shadow based on geocode location, time and vehicle dynamics; detect one or more actual vehicle shadows in one or more images from vehicle cameras; compare the one or more actual vehicle shadows to one or more expected vehicle shadows; determine a dimension profile and max height point for a vehicle plus vehicle cargo based on a comparison of one or more actual vehicle shadows to the one or more expected vehicle shadows; calculate a confidence level for the dimension profile and max height point for the vehicle plus cargo; and use the dimension profile and max height point to provide one or more dimension notifications when the confidence level for the dimension profile and max height point for the vehicle plus cargo are above a first threshold level.

In one embodiment of the vehicle, the controller is further configured to calculate the confidence level for the dimension profile and max height point for the vehicle plus cargo based on: how many observed shadows are used to determine the dimension profile and max height point, how many different vehicle travel directions are represented by the observed shadows, and magnitude and intensity of the observed shadows.

In one embodiment of the vehicle, the controller is further configured to store the dimension profile and max height point for a vehicle plus vehicle cargo to accelerate future calculations when the confidence level for the dimension profile and max height point for the vehicle plus cargo is higher than the first threshold level.

In one embodiment of the vehicle, the controller is further configured to: calculate an expected trailer shadow based on geocode location, time and vehicle dynamics; detect one or more actual trailer shadows in one or more images from vehicle cameras; compare the one or more actual trailer shadows to one or more expected trailer shadows; determine a dimension profile and max height point for a trailer based on a comparison of one or more actual trailer shadows to the one or more expected trailer shadows; calculate a confidence level for the dimension profile and max height point for the trailer; and use the dimension profile and max height point for the trailer to provide one or more dimension notifications when the confidence level for the dimension profile and max height point for the trailer are above a second threshold level.

In one embodiment of the vehicle, the controller is further configured to calculate the expected trailer height from a given shadow using trailer width (if known) and length (if known) as a reference.

In one embodiment of the vehicle, the controller is further configured to calculate the confidence level for the dimension profile and max height point for the trailer based on: how many observed shadows are used to determine the dimension profile and max height point for the trailer, how many different trailer travel directions are represented by the observed shadows, and magnitude and intensity of the observed shadows.

In one embodiment of the vehicle, the controller is further configured to store the dimension profile and max height point for the trailer to accelerate future calculations when the confidence level for the dimension profile and max height point for the trailer is higher than the second threshold level.

In one embodiment of the vehicle, to calculate the confidence level for the dimension profile and max height point, the controller is configured to: determine a level of illumination (e.g., image brightness) from an image histogram of an image; stretch the image histogram to maximize contrast (e.g., shadow enhancement), wherein histogram stretching involves modifying brightness (e.g., intensity) values of pixels in the image according to a mapping function that specifies an output pixel brightness value for each input pixel brightness value; calculate a level of contrast in shadow portions of the image (used as a measurement of shadow quality (1 sample)) based on the image histogram being stretched; repeat the determine a level of illumination, stretch the image histogram, and calculate the level of contrast for a predetermine number of times for a major travel direction; calculate a shadow quality measurement including a mean and variance for the level of contrast for the major travel direction after the predetermined number of times; and determine the shadow quality measurement for each of a plurality of major travel directions (N, NE, E, SE, S, SW, W, NW) the vehicle has driven in, wherein the vehicle confidence level is based on the shadow quality measurement and the directions travelled.

In one embodiment of the vehicle, the controller is further configured to calculate a dimension profile and max height point for a vehicle plus vehicle cargo and/or a trailer from shadows formed from artificial light (such as streetlights at night).

In one embodiment of the vehicle, to calculate a dimension profile and max height point for a trailer from shadows formed from artificial light the controller is configured to: estimate an expected vehicle shadow at a first position; detect an actual vehicle shadow from artificial light at the first position via image detection operations on an image of the vehicle; calculate a dimension scaling factor based on a difference between the expected vehicle shadow and the actual vehicle shadow; retrieve images containing a trailer shadow when the trailer is at the first position (e.g., as determined based on vehicle odometry); estimate a dimension profile and max height point for the trailer using the scaling factor; calculate a confidence level for the dimension profile and max height point for the trailer; and use the dimension profile and max height point for the trailer to provide one or more dimension notifications when the confidence level for the dimension profile and max height point are above a third threshold level.

In one embodiment of the vehicle, the controller is configured to calculate the confidence level for the dimension profile and max height point for the trailer based on: vehicle dynamics, magnitude and intensity of the observed shadows, and confidence in vehicle dimensions (e.g., previously observed or not).

In one embodiment of the vehicle, to calculate the confidence level of the dimension profile and max height point for the trailer, the controller is configured to: determine a level of illumination (e.g., image brightness) from image histogram of an image; stretch the image histogram to maximize contrast (e.g., shadow enhancement), wherein histogram stretching involves modifying brightness (e.g., intensity) values of pixels in the image according to a mapping function that specifies an output pixel brightness value for each input pixel brightness value; calculate a level of contrast in shadow portions of the image (e.g., used as a measurement of shadow quality (e.g., 1 sample)) based on the image histogram being stretched; repeat the determine a level of illumination, stretch the image histogram, and calculate the level of contrast for a predetermine number of times for a major travel direction; calculate a shadow quality measurement including a mean and variance for the level of contrast for the major travel direction after the predetermined number of times; and determine the shadow quality measurement for each of a plurality of major travel directions (e.g., N, NE, E, SE, S, SW, W, NW) the vehicle has driven in, wherein the vehicle confidence level is based on the shadow quality measurement and the directions travelled.

In one embodiment of the vehicle, the controller is further configured to store the dimension profile and max height point for the trailer to accelerate future calculations when the confidence level for the dimension profile and max height point for the trailer is higher than a threshold level.

In one embodiment of the vehicle, the controller is further configured to calculate the dimension scaling factor based on a difference between a known reference area on the vehicle and its shadow.

In one embodiment of the vehicle, the known reference area includes a vehicle bumper, vehicle roof, vehicle hood, or vehicle trunk.

In one embodiment of the vehicle, the one or more dimension notifications includes: a message on a navigational display that provides a message indicating a possible obstruction.

In one embodiment of the vehicle, the one or more dimension notifications includes a symbol representative of a dimension-restricted item on a graphical user interface (GUI) and an indication on the GUI as to whether the dimension-restricted item poses a problem based on the estimated dimension profile and max height point.

In one embodiment of the vehicle, the symbol representative of a dimension-restricted item provides an indication as to whether the dimension-restricted item poses a problem based on a color in which the symbol is displayed.

In one embodiment of the vehicle, the one or more dimension notifications includes a graphical indication that includes a text box that provides estimated dimensions, a symbol that is representative of the object to which the dimensions pertain and displayed in a color that indicates a confidence level for the estimated dimensions, a button for accepting the estimated dimensions, and a button for declining the estimated dimensions.

In one embodiment of the vehicle, the controller is further configured to initiate a request to vehicles in proximity to the host vehicle to retrieve dimensions determined based on shadows.

In one embodiment of the vehicle, the controller is further configured to determine dimensions for another vehicle based on shadows.

In another embodiment, a method in a vehicle is disclosed. The method includes calculating solar position and an expected vehicle shadow based on geocode location, time and vehicle dynamics; detecting one or more actual vehicle shadows in one or more images from vehicle cameras; comparing the one or more actual vehicle shadows to one or more expected vehicle shadows; determining a dimension profile and max height point for a vehicle plus vehicle cargo based on comparing one or more actual vehicle shadows to the one or more expected vehicle shadows; calculating a confidence level for the dimension profile and max height point for the vehicle plus cargo; and using the dimension profile and max height point to provide one or more dimension notifications when the confidence level for the dimension profile and max height point for the vehicle plus cargo are above a first threshold level.

In one embodiment, the method further includes calculating the confidence level for the dimension profile and max height point for the vehicle plus cargo based on: how many observed shadows are used to determine the dimension profile and max height point, how many different vehicle travel directions are represented by the observed shadows, and magnitude and intensity of the observed shadows.

In one embodiment, the method further includes storing the dimension profile and max height point for a vehicle plus vehicle cargo to accelerate future calculations when the confidence level for the dimension profile and max height point for the vehicle plus cargo is higher than the first threshold level.

In one embodiment, the method further includes: calculating an expected trailer shadow based on geocode location, time and vehicle dynamics; detecting one or more actual trailer shadows in one or more images from vehicle cameras; comparing the one or more actual trailer shadows to one or more expected trailer shadows; determining a dimension profile and max height point for a trailer based on a comparison of one or more actual trailer shadows to the one or more expected trailer shadows; calculating a confidence level for the dimension profile and max height point for the trailer; and using the dimension profile and max height point for the trailer to provide one or more dimension notifications when the confidence level for the dimension profile and max height point for the trailer are above a second threshold level.

In one embodiment, the method further includes calculating the expected trailer height from a given shadow using trailer width (if known) and length (if known) as a reference.

In one embodiment, the method further includes calculating the confidence level for the dimension profile and max height point for the trailer based on: how many observed shadows are used to determine the dimension profile and max height point for the trailer, how many different trailer travel directions are represented by the observed shadows, and magnitude and intensity of the observed shadows.

In one embodiment, the method further includes storing the dimension profile and max height point for the trailer to accelerate future calculations when the confidence level for the dimension profile and max height point for the trailer is higher than the second threshold level.

In one embodiment of the method, calculating the confidence level for the dimension profile and max height point includes: determining a level of illumination (e.g., image brightness) from an image histogram of an image; stretching the image histogram to maximize contrast (e.g., shadow enhancement), wherein histogram stretching involves modifying brightness (e.g., intensity) values of pixels in the image according to a mapping function that specifies an output pixel brightness value for each input pixel brightness value; calculating a level of contrast in shadow portions of the image (used as a measurement of shadow quality (1 sample)) based on the image histogram being stretched; repeating the determining a level of illumination, stretching the image histogram, and calculating the level of contrast for a predetermine number of times for a major travel direction; calculating a shadow quality measurement including a mean and variance for the level of contrast for the major travel direction after the predetermined number of times; and determining the shadow quality measurement for each of a plurality of major travel directions (N, NE, E, SE, S, SW, W, NW) the vehicle has driven in, wherein the vehicle confidence level is based on the shadow quality measurement and the directions travelled.

In one embodiment, the method further includes calculating a dimension profile and max height point for a vehicle plus vehicle cargo and/or a trailer from shadows formed from artificial light (such as streetlights at night).

In one embodiment, calculating a dimension profile and max height point for a trailer from shadows formed from artificial light includes: estimating an expected vehicle shadow at a first position; detecting an actual vehicle shadow from artificial light at the first position via image detection operations on an image of the vehicle; calculating a dimension scaling factor based on a difference between the expected vehicle shadow and the actual vehicle shadow; retrieving images containing a trailer shadow when the trailer is at the first position (e.g., as determined based on vehicle odometry); estimating a dimension profile and max height point for the trailer using the scaling factor; calculating a confidence level for the dimension profile and max height point for the trailer; and using the dimension profile and max height point for the trailer to provide one or more dimension notifications when the confidence level for the dimension profile and max height point are above a third threshold level.

In one embodiment of the method includes calculating the confidence level for the dimension profile and max height point for the trailer based on: vehicle dynamics, magnitude and intensity of the observed shadows, and confidence in vehicle dimensions (e.g., previously observed or not).

In one embodiment, calculating the confidence level of the dimension profile and max height point for the trailer includes: determining a level of illumination (e.g., image brightness) from image histogram of an image; stretching the image histogram to maximize contrast (e.g., shadow enhancement), wherein histogram stretching involves modifying brightness (e.g., intensity) values of pixels in the image according to a mapping function that specifies an output pixel brightness value for each input pixel brightness value; calculating a level of contrast in shadow portions of the image (e.g., used as a measurement of shadow quality (e.g., 1 sample)) based on the image histogram being stretched; repeating the determining a level of illumination, stretching the image histogram, and calculating the level of contrast for a predetermine number of times for a major travel direction; calculating a shadow quality measurement including a mean and variance for the level of contrast for the major travel direction after the predetermined number of times; and determining the shadow quality measurement for each of a plurality of major travel directions (e.g., N, NE, E, SE, S, SW, W, NW) the vehicle has driven in, wherein the vehicle confidence level is based on the shadow quality measurement and the directions travelled.

In one embodiment, the method further includes storing the dimension profile and max height point for the trailer to accelerate future calculations when the confidence level for the dimension profile and max height point for the trailer is higher than a threshold level.

In one embodiment, the method further includes calculating the dimension scaling factor based on a difference between a known reference area on the vehicle and its shadow.

In one embodiment of the method, the known reference area includes a vehicle bumper, vehicle roof, vehicle hood, or vehicle trunk.

In one embodiment of the method, the one or more dimension notifications includes: a message on a navigational display that provides a message indicating a possible obstruction.

In one embodiment of the method, the one or more dimension notifications includes a symbol representative of a dimension-restricted item on a graphical user interface (GUI) and an indication on the GUI as to whether the dimension-restricted item poses a problem based on the estimated dimension profile and max height point.

In one embodiment of the method, the symbol representative of a dimension-restricted item provides an indication as to whether the dimension-restricted item poses a problem based on a color in which the symbol is displayed.

In one embodiment of the method, the one or more dimension notifications includes a graphical indication that includes a text box that provides estimated dimensions, a symbol that is representative of the object to which the dimensions pertain and displayed in a color that indicates a confidence level for the estimated dimensions, a button for accepting the estimated dimensions, and a button for declining the estimated dimensions.

In one embodiment, the method further includes initiating a request to vehicles in proximity to the host vehicle to retrieve dimensions determined based on shadows.

In one embodiment, the method further includes determining dimensions for another vehicle based on shadows.

BRIEF DESCRIPTION OF THE DRAWINGS

The exemplary embodiments will hereinafter be described in conjunction with the following drawing figures, wherein like numerals denote like elements, and wherein:

FIGS. 6A—6B provide example graphical indications that could be used to indicate dimension estimations for a vehicle and/or a trailer, in accordance with various embodiments.

DETAILED DESCRIPTION

Figure 1:
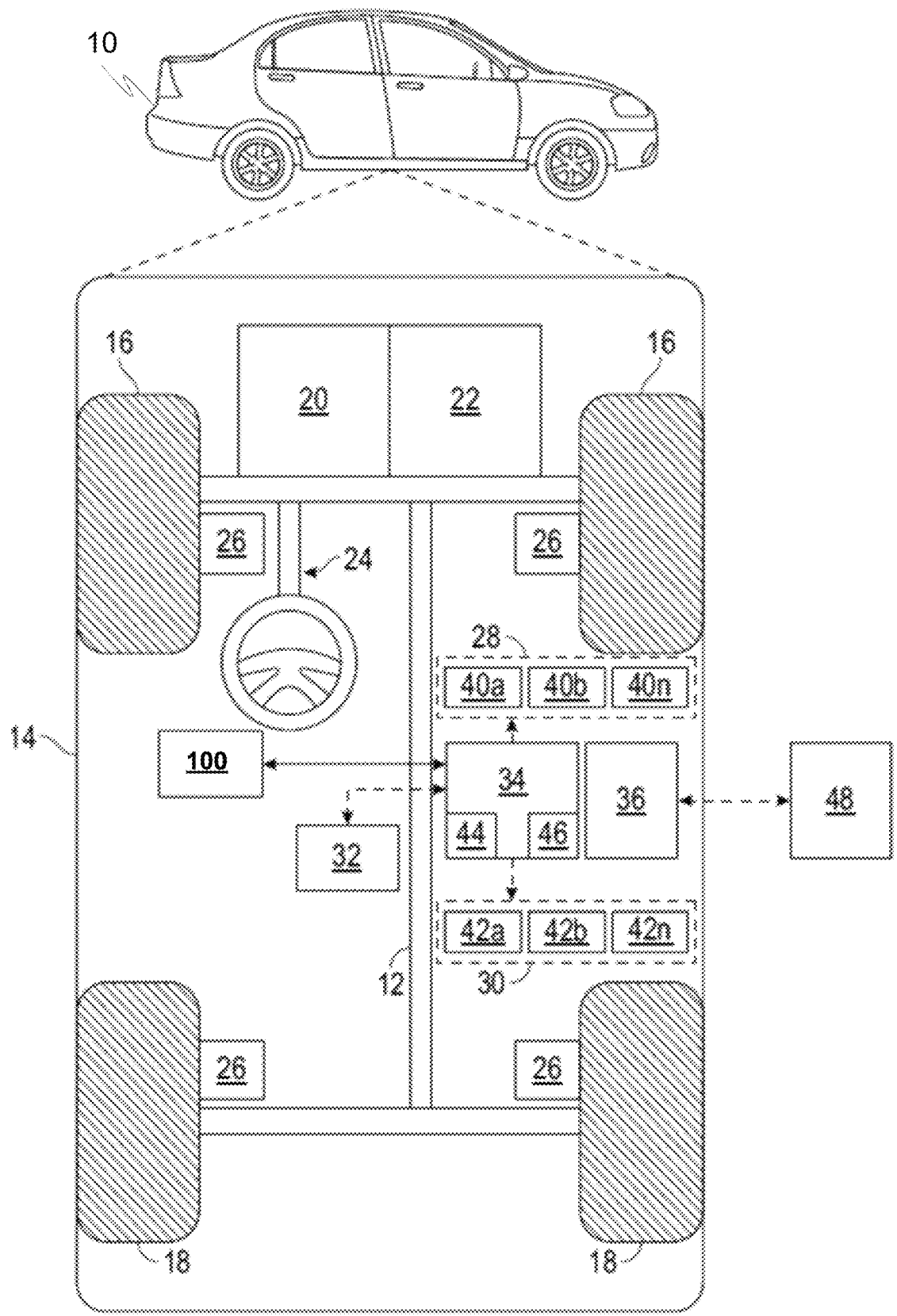
FIG. 1 is a diagram depicting an example vehicle that includes a dimension calculation system for dynamically calculating a vehicle and/or trailer dimension using shadow information, in accordance with an embodiment.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The dimensions of cargo loaded on top of a vehicle and/or the dimensions of a trailer hitched to a vehicle may be difficult for a vehicle operator to ascertain. For example, the top of cargo may be difficult to reach, and vehicle and/or trailer camera systems may not have a clear view of vehicle/trailer height. Not knowing the dimensions, especially height, can be problematic particularly when the vehicle with the cargo and/or trailer is driven in a dimension-restricted area, such as some parking garages, bridges, and others. Driving a vehicle with excess height due to cargo and/or a trailer can result in unexpected collisions with road furniture or may simply not provide a user friendly interface for vehicle applications requiring vehicle dimensions (such as a trailering app).

In various embodiments, apparatus, systems, techniques, and articles disclosed herein can estimate the dimensions of a vehicle/trailer/cargo through observation of shadows, solar constellation, and vehicle dynamics/pose. If a shadow is not available/usable, in various embodiments, apparatus, systems, techniques, and articles disclosed herein can use V2X communications (Vehicle-to-everything, which is communication between a vehicle and any entity that may affect, or may be affected by, the vehicle) to request dimensions from vehicles in the proximity that can estimate the dimensions of a vehicle/trailer/cargo through observation of shadows, solar constellation, and vehicle dynamics/pose. In various embodiments, apparatus, systems, techniques, and articles disclosed herein can display vehicle dimensions estimated through observation of shadows, solar constellation, and vehicle dynamics/pose. In various embodiments, apparatus, systems, techniques, and articles disclosed herein can display a confidence level associated with the estimated dimensions and provide warnings in situations where vehicle dimensions are not compatible with upcoming dimension-restricted areas.

In various embodiments, apparatus, systems, techniques, and articles disclosed herein can estimate vehicle and trailer dimensions based on dynamic shadow detection during daytime (e.g., sunlight, parallel light beams, shape from shading/monoplotting). In various embodiments, apparatus, systems, techniques, and articles disclosed herein can estimate vehicle dimensions based on dynamic shadow detection during nighttime (e.g., artificial light, non-parallel light beams) using an expected shadow as a reference. In various embodiments, apparatus, systems, techniques, and articles disclosed herein can estimate trailer dimensions based on dynamic shadow detection during nighttime (e.g., artificial light, non-parallel light beams) using an expected shadow of a known object or host vehicle as a reference. In various embodiments, apparatus, systems, techniques, and articles disclosed herein can provide an estimation of a confidence level and accuracy level of estimated dimensions. In various embodiments, apparatus, systems, techniques, and articles disclosed herein can use an external vehicle to estimate vehicle/trailer dimensions using V2X. In various embodiments, apparatus, systems, techniques, and articles disclosed herein can use an HMI (human machine interface) for displaying estimated vehicle/trailer dimensions and a confidence level for the estimation.

FIG. 1 is a diagram depicting an example vehicle 10 that includes a dimension calculation system 100 for dynamically calculating a vehicle and/or trailer dimension (e.g., height, length, and/or width) using shadow information. As depicted in FIG. 1, the example vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. The vehicle 10 is depicted in the illustrated embodiment as a passenger car, but other vehicle types, including trucks, sport utility vehicles (SUVs), recreational vehicles (RVs), etc., may also be used. The vehicle 10 may be capable of being driven manually, autonomously and/or semi-autonomously.

The vehicle 10 further includes a propulsion system 20, a transmission system 22 to transmit power from the propulsion system 20 to vehicle wheels 16-18, a steering system 24 to influence the position of the vehicle wheels 16-18, a brake system 26 to provide braking torque to the vehicle wheels 16-18, a sensor system 28, an actuator system 30, at least one data storage device 32, at least one controller 34, and a communication system 36 that is configured to wirelessly communicate information to and from other entities 48.

The sensor system 28 includes one or more sensing devices 40a-40r that sense observable conditions of the exterior environment and/or the interior environment of the autonomous vehicle 10. The sensing devices 40a-40n can include but are not limited to, radars, lidars, global positioning systems, optical cameras, thermal cameras, ultrasonic sensors, inertial measurement units, Ultra-Wideband sensors, and/or other sensors. The actuator system 30 includes one or more actuator devices 42a-42n that control one or more vehicle features such as, but not limited to, the propulsion system 20, the transmission system 22, the steering system 24, and the brake system 26.

The data storage device 32 stores data for use in automatically controlling the vehicle 10. The data storage device 32 may be part of the controller 34, separate from the controller 34, or part of the controller 34 and part of a separate system. The controller 34 includes at least one processor 44 and a computer-readable storage device or media 46. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

The processor 44 can be any custom made or commercially available processor, a central processing unit (CPU), a graphics processing unit (GPU), an auxiliary processor among several processors associated with the controller 34, a semiconductor-based microprocessor (in the form of a microchip or chipset), a macro processor, any combination thereof, or generally any device for executing instructions. The computer-readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of several known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34.

The programming instructions may include one or more separate programs, each of which comprises an ordered listing of executable instructions for implementing logical functions. The one or more instructions of the controller 34, when executed by the processor 44, may configure the vehicle 10 to continuously calculate controllable steering angles for directing the articulated transport system to direct the final trailer in a desired direction and control the articulated transport system to direct the final trailer in the desired direction using the calculated controllable steering angles.

The dimension calculation system 100 may include any number of sub-modules embedded within the controller 34, which may be combined and/or further partitioned to similarly implement systems and methods described herein. Additionally, inputs to the dimension calculation system 100 may be received from the sensor system 28, received from other control modules (not shown) associated with the vehicle 10, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like.

Figure 2:
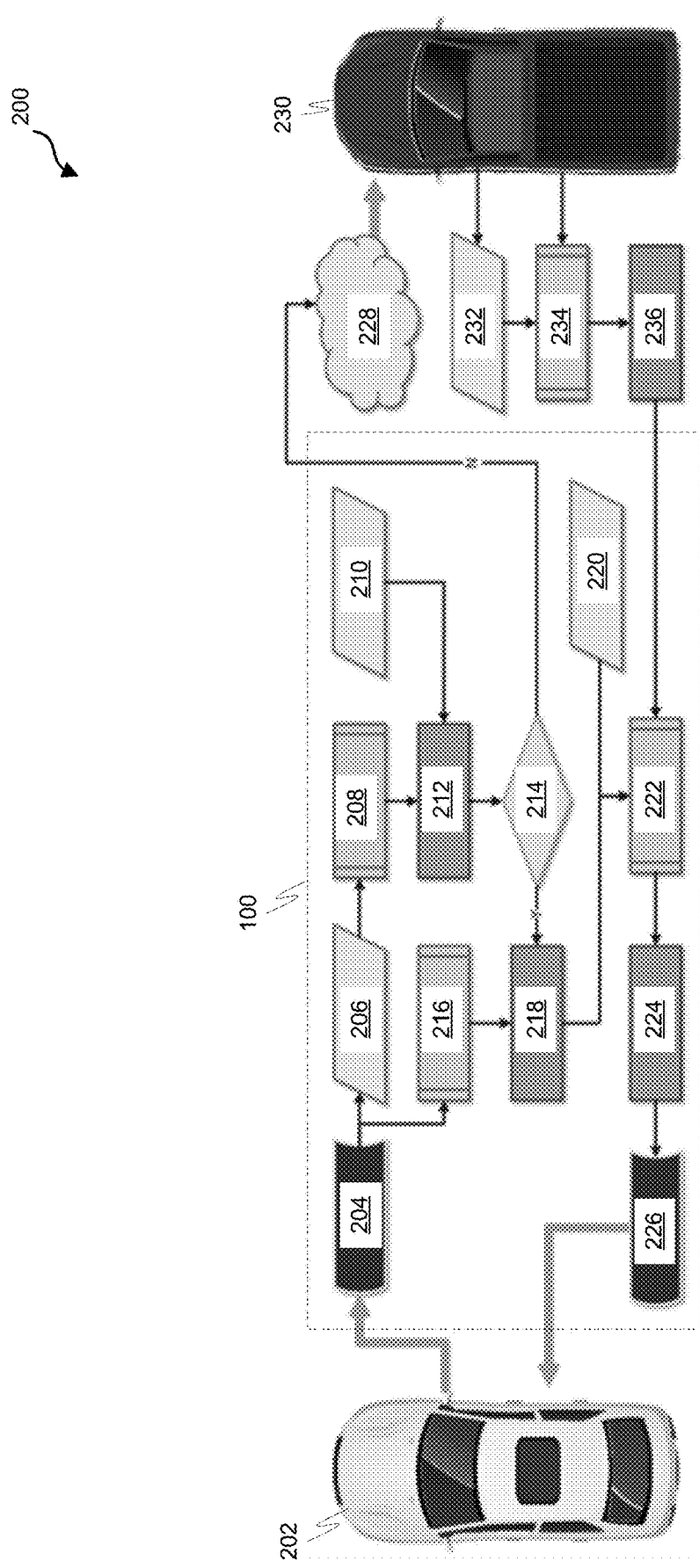
FIG. 2 is a block diagram depicting an example environment that includes an example dimension calculation system for dynamically calculating a vehicle and/or trailer dimension using shadow information, in accordance with an embodiment.

FIG. 2 is a block diagram depicting an example environment 200 that includes an example dimension calculation system 100 for dynamically calculating a vehicle and/or trailer dimension using shadow information. The example environment 200 includes a host vehicle 202 that includes the example dimension calculation system 100 and a target vehicle 230 that optionally may include a dimension calculation system.

The example dimension calculation system 100 is implemented by a controller and is configured to receive camera images 204 from vehicle sensors from the host vehicle 202, such one or more vehicle cameras that take images of the surroundings of the host vehicle. From the camera images 204, the example dimension calculation system 100 is configured to detect an actual vehicle shadow. The example dimension calculation system 100 does so by getting an image 206 of the vehicle and its shadow from the camera images. The image 206 may be a single image from a vehicle camera or a stitched together image from multiple vehicle cameras.

From the image 206, the example dimension calculation system 100 performs histogram equalization using a histogram equalization engine 208. Based on the histogram equalization and preexisting calibratable thresholds for shadow detection 210, the example dimension calculation system 100 performs shadow detection operations to detect an actual vehicle shadow using a shadow detection engine 212. The example dimension calculation system 100 determines whether a shadow was detected by the shadow detection engine 212 at operation 214.

When a shadow is detected by the shadow detection engine 212, the example dimension calculation system 100 performs image processing operations using a camera intrinsic and extrinsic transformations engine 216 on the image 206 and calculates shadow dimensions using a shadow dimensions engine 218. The intrinsic and extrinsic transformations are performed on a given image to allow the computer/vehicle to understand the image. The intrinsic parameters contain focal length, lens distortion characteristics, field of view, etc. The extrinsic parameters contain the camera position and orientation. The shadow dimensions may provide a dimension profile (e.g., height, length, and/or width profile) and a max height point for a vehicle having vehicle cargo mounted on top of the vehicle. The shadow dimensions engine 218 calculates a solar position for the vehicle and an expected vehicle shadow based on geocode location, time and vehicle dynamics (e.g., direction of travel), compares an actual vehicle shadow determined from the image 206 to the expected vehicle shadow, and determines shadow dimensions (e.g., a dimension profile and max height point for the vehicle plus vehicle cargo) based on the comparison of the actual vehicle shadow to the expected vehicle shadow using calibratable error thresholds 220.

The example dimension calculation system 100 employs a confidence ratio engine 222 to calculate a confidence ratio 224 for the shadow dimensions (e.g., a dimension profile and max height point for the vehicle plus vehicle cargo). The example dimension calculation system 100 is further configured to store the shadow dimensions to accelerate future calculations when the confidence level for the shadow dimensions is higher than a threshold level. In one embodiment, the confidence ratio engine 222 calculates the confidence ratio 224 for the shadow dimensions based on: how many observed shadows are used to determine the shadow dimensions, how many different vehicle travel directions are represented by the observed shadows, and the magnitude and intensity of the observed shadows.

In one embodiment, the confidence ratio engine 222 calculates the confidence ratio 224 for the shadow dimensions based on: determining a level of illumination (image brightness) from an image histogram of an image 206; stretching the image histogram to maximize contrast (shadow enhancement), wherein histogram stretching involves modifying brightness (intensity) values of pixels in the image according to a mapping function that specifies an output pixel brightness value for each input pixel brightness value; calculating a level of contrast in shadow portions of the image (used as a measurement of shadow quality) based on the image histogram being stretched; and repeating the determining a level of illumination, stretching the image histogram, and calculating the level of contrast for a predetermined number of times for a major travel direction (N, NE, E, SE, S, SW, W, NW). The confidence ratio engine 222 further calculates the confidence ratio 224 for the shadow dimensions based on: calculating a shadow quality measurement comprising a mean and variance for the level of contrast for the major travel direction after the predetermined number of times; and determining the shadow quality measurement for each of a plurality of major travel directions the vehicle has driven in, wherein the vehicle confidence level is based on the shadow quality measurement and the directions travelled.

The example dimension calculation system 100 uses the shadow dimensions (e.g., a dimension profile and max height point for the vehicle plus vehicle cargo) and the confidence ratio 224 to determine and provide outputs 226 for display in an HMI within the vehicle 202 to provide one or more alerts to a vehicle operator. The alerts may include dimension notifications when the confidence level for the shadow dimensions are above a threshold level.

When a shadow was not detected by the shadow detection engine 212, the example dimension calculation system 100 may send a request 228 (e.g., a V2X request) to a target vehicle 230 in proximity to the host vehicle 202 to provide host vehicle dimensions. The target vehicle 230 may obtain images 232 from target vehicle sensors from the target vehicle 230, such one or more target vehicle cameras, use a camera intrinsic and extrinsic transformations engine 234 associated with the target vehicle 230 on the image 232 to calculate host vehicle shadow dimensions 236, and send the vehicle shadow dimensions 236 to the dimension calculation system 100. The example dimension calculation system 100 may periodically send a V2X request 228 to calculate host vehicle's dimensions from target vehicle cameras. The example dimension calculation system 100 may also periodically calculate target vehicle dimensions to send via V2X when requested.

The example dimension calculation system 100 may subsequently employ the confidence ratio engine 222 to calculate a confidence ratio 224 for the shadow dimensions 236, and the example dimension calculation system 100 may uses the shadow dimensions 236 and the confidence ratio 224 to determine and provide outputs for display in the HMI within the vehicle 202 to provide one or more alerts to a vehicle operator.

While in the foregoing example implementation, the example dimension calculation system 100 was used to calculate shadow dimensions and a confidence ratio 224 for a vehicle with cargo on top, the example dimension calculation system 100 may, alternatively or in parallel, be employed to calculate shadow dimensions and a confidence ratio 224 for a trailer towed by the host vehicle 202. In this scenario, the example dimension calculation system 100 may receive camera images 204 from vehicle sensors from the host vehicle 202 and detect an actual trailer shadow. The example dimension calculation system 100 does so by getting an image 206 of the trailer and its shadow from the camera images. The image 206 may be a single image from a vehicle camera or a stitched together image from multiple vehicle cameras.

From the image 206, the example dimension calculation system 100 performs histogram equalization using a histogram equalization engine 208. Based on the histogram equalization and preexisting calibratable thresholds for shadow detection 210, the example dimension calculation system 100 performs shadow detection operations to detect an actual trailer shadow using a shadow detection engine 212. The example dimension calculation system 100 determines whether a shadow was detected by the shadow detection engine 212 at operation 214.

When a shadow was detected by the shadow detection engine 212, the example dimension calculation system 100 performs image processing operations using a camera intrinsic and extrinsic transformations engine 216 on the image 206 and calculates shadow dimensions using a shadow dimensions engine 218. The shadow dimensions provides a dimension profile and max height point for trailer. The shadow dimensions engine 218 may calculate a solar position for the trailer and an expected trailer shadow based on geocode location, time, vehicle dynamics (e.g., direction of travel), trailer length, and trailer width, compare an actual trailer shadow determined from the image 206 to the expected trailer shadow, and determine shadow dimensions (e.g., a dimension profile and max height point for the trailer) based on the comparison of the actual trailer shadow to the expected trailer shadow using calibratable error thresholds 220.

The example dimension calculation system 100 employs the confidence ratio engine 222 to calculate a confidence ratio 224 for the shadow dimensions. The example dimension calculation system 100 is also configured to store the shadow dimensions to accelerate future calculations when the confidence level for the shadow dimensions is higher than a threshold level. In one embodiment, the confidence ratio engine 222 calculates the confidence ratio 224 for the shadow dimensions based on: how many observed shadows are used to determine the dimension profile and max height point for the trailer, how many different trailer travel directions are represented by the observed shadows, and magnitude and intensity of the observed shadows.

The example dimension calculation system 100 uses the shadow dimensions and the confidence ratio 224 to determine and provide outputs for display in the HMI within the vehicle 202 to provide one or more alerts to a vehicle operator. The alerts may include dimension notifications when the confidence level for the shadow dimensions are above a threshold level.

When a shadow was not detected by the shadow detection engine 212, the example dimension calculation system 100 may send a request 228 (e.g., a V2X request) to a target vehicle 230 in proximity to the host vehicle 202 to provide trailer dimensions. The target vehicle 230 may obtain images 232 from target vehicle sensors from the target vehicle 230, such one or more target vehicle cameras, use a camera intrinsic and extrinsic transformations engine 234 associated with the target vehicle 230 on the image 232 to calculate trailer shadow dimensions 236, and send the trailer shadow dimensions 236 to the dimension calculation system 100.

The example dimension calculation system 100 may subsequently employ the confidence ratio engine 222 to calculate a confidence ratio 224 for the shadow dimensions 236, and the example dimension calculation system 100 may uses the shadow dimensions 236 and the confidence ratio 224 to determine and provide outputs for display in the HMI within the vehicle 202 to provide one or more alerts to a vehicle operator.

In another example implementation of the example dimension calculation system 100, shadow dimensions for a trailer and a confidence ratio 224 may be determined based on shadows from artificial light (e.g., streetlights at night). In this example scenario, the example dimension calculation system 100 may calculate trailer dimension from shadows formed from artificial light by estimating an expected vehicle shadow at a position (x); detecting an actual vehicle shadow from artificial light with image detection on images 206 at position (x); calculating a dimension scaling factor based on difference between the expected vehicle shadow and the actual vehicle shadow; retrieving an image 206 containing a trailer shadow when the trailer is at position (x), for example, as determined based on vehicle odometry. The dimension scaling factor may be calculated based on a difference between a known reference area on the vehicle and its shadow. The known reference area may include a vehicle bumper, vehicle roof, vehicle hood, or vehicle trunk.

The example dimension calculation system 100 may further calculate trailer dimensions from shadows formed from artificial light by estimating a dimension profile and max height point for the trailer using the scaling factor and calculating a confidence ratio 224 for the dimension profile and max height point for the trailer. In one embodiment, the confidence ratio engine 222 calculates the confidence ratio 224 based on: vehicle dynamics, magnitude and intensity of the observed shadows, and confidence in vehicle dimensions (e.g., previously observed or not).

In one embodiment, the confidence ratio engine 222 calculates the confidence ratio 224 for the shadow dimensions based on: determining a level of illumination (image brightness) from an image histogram of an image 206; stretching the image histogram to maximize contrast (shadow enhancement), wherein histogram stretching involves modifying brightness (intensity) values of pixels in the image according to a mapping function that specifies an output pixel brightness value for each input pixel brightness value; calculating a level of contrast in shadow portions of the image (used as a measurement of shadow quality) based on the image histogram being stretched; and repeating the determining a level of illumination, stretching the image histogram, and calculating the level of contrast for a predetermined number of times for a major travel direction (N, NE, E, SE, S, SW, W, NW). The confidence ratio engine 222 further calculates the confidence ratio 224 for the shadow dimensions based on: calculating a shadow quality measurement comprising a mean and variance for the level of contrast for the major travel direction after the predetermined number of times; and determining the shadow quality measurement for each of a plurality of major travel directions the vehicle has driven in, wherein the vehicle confidence level is based on the shadow quality measurement and the directions travelled.

The example dimension calculation system 100 may use the dimension profile and max height point for the trailer and the confidence ratio 224 to determine and provide outputs for display in the HMI within the vehicle 202 to provide one or more alerts to a vehicle operator.

Figure 3:
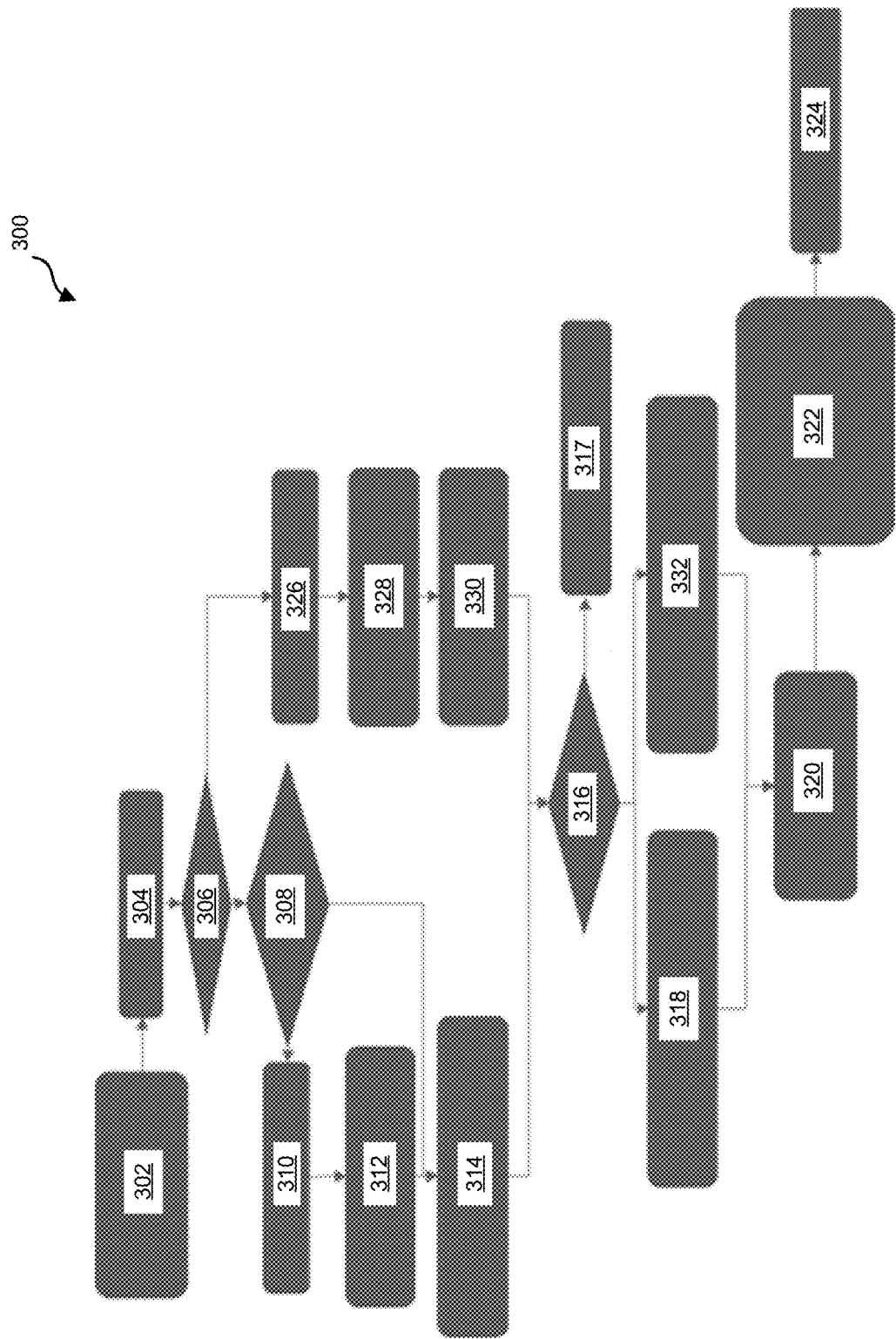
FIG. 3 is a process flow chart depicting an example process for dynamically calculating a vehicle and/or trailer dimension using shadow information, in accordance with an embodiment.

FIG. 3 is a process flow chart depicting an example process 300 for dynamically calculating a vehicle and/or trailer dimension using shadow information.

At operation 302, a vehicle operator mounts cargo on roof/bed of host vehicle and/or couples a trailer to the host vehicle. At operation 304, the vehicle operator starts driving the host vehicle. The process 300 includes, at decision 306, determining whether a trailer is attached to the host vehicle. If a trailer is attached (yes at decision 306), the process 300 includes determining, at decision 308, whether a trailer-dimension profile is found. If a trailer profile is found (yes at decision 308), the process includes, at decision 310, retrieving the trailer dimension profile. At operation 312, the process 300 includes calculating an expected trailer shadow based on the location of the sum and direction of travel, and at operation 314 includes surround view cameras and/or trailer camera(s) observing the shadow of the trailer. If a trailer profile is not found (no at decision 308), the process 300 includes, at operation 314, surround view cameras and/or trailer camera(s) observing the shadow of the trailer.

The process 300 includes, at decision 316, determining whether the observed shadow quality is good. If the observed shadow quality is not good (no at decision 316), the process 300 includes, at operation 317, providing a display on an HMI that indicates that a dimension estimation is not available or offline. If the observed shadow quality is good (yes at decision 316) the process 300 includes, at operation 318, obtaining trailer dimension profile from current camera observations. At operation 320, the process 300 includes determining a difference between a predicted and the observed shadow. At operation 322, the process 300 includes calculating confidence and accuracy based on number of directions and sun angles at which the shadow was observed, length of observation time, and contrasts of shadow. At operation 324, the process 300 includes providing an output to an HMI system in the host vehicle.

If a trailer is not attached (no at decision 306), the process includes, at operation 326, retrieving a vehicle dimension profile. At operation 328, the process 300 includes calculating an expected vehicle shadow based on the location of the sun and direction of travel. At operation 330, the example process 300 includes the surround view cameras observing the shadow of the vehicle. The process 300 includes, at decision 316, determining whether the observed vehicle shadow quality is good. If the observed vehicle shadow quality is not good (no at decision 316), the process 300 includes, at operation 317, providing a display on an HMI that indicates that the dimension estimation is not available or offline. If the observed vehicle shadow quality is good (yes at decision 316) the process 300 includes, at operation 332, obtaining a vehicle dimension profile from current camera observations. At operation 320, the process 300 includes determining difference between predicted and observed shadows. At operation 322, the process 300 includes calculating a confidence level and accuracy based on the number of directions and sun angles at which the shadow was observed, length of observation time, and contrasts of shadow. At operation 324, the process 300 includes providing an output to an HMI system in the host vehicle. The vehicle dimension estimations may also occur when a trailer is attached.

Figure 4:
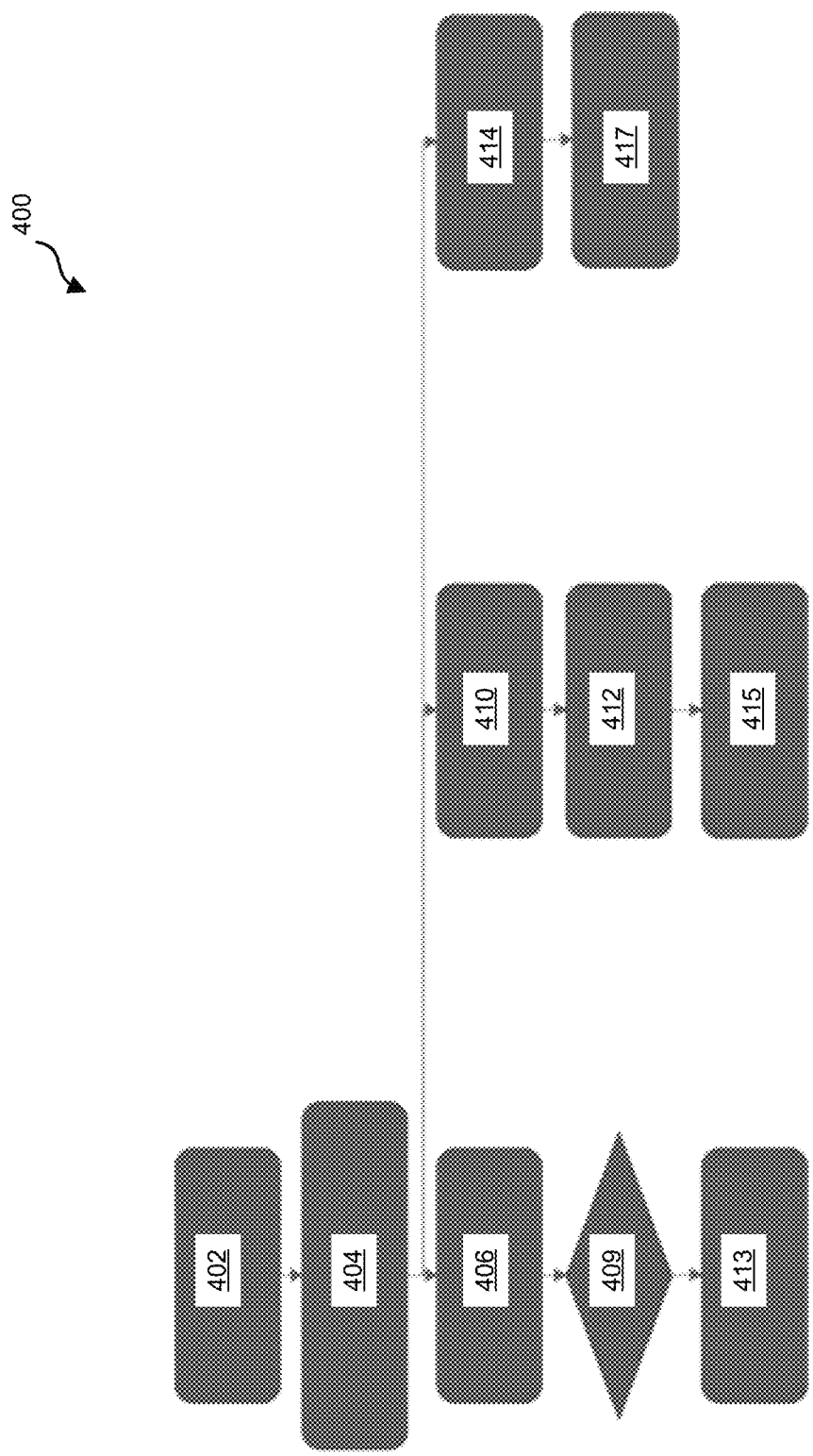
FIG. 4 is a process flow chart depicting an example process 400 for providing alerts via an HMI (human machine interface) as a result of calculating a vehicle and/or trailer dimension using shadow information, in accordance with an embodiment.

FIG. 4 is a process flow chart depicting an example process 400 for providing alerts via an HMI as a result of calculating a vehicle and/or trailer dimension using shadow information.

At operation 402, a vehicle operator mounts cargo on roof/bed of host vehicle and/or couples a trailer to the host vehicle. At operation 404, the process 400 includes analyzing the shadow to calculate dimension profile, confidence, and accuracy. The analysis may be performed in accordance with a process described in connection with FIG. 2 and/or FIG. 3.

After the analysis, there are at least three options for use for displaying output from the analysis via an HMI. In a first option, a vehicle operator enters a navigational route and driving begins (operation 406). A dimension analysis system looks ahead and determines if there are any dimension-restricted items to investigate. If the dimension analysis system determines that there is a dimension-restricted item of concern, the dimension analysis system can check the dimension requirements for the dimension-restricted item against the dimension determined based on the shadow analysis. An example of a dimension-restricted item includes a bridge that restricts passage to vehicles that are below a certain height level, a parking structure that restricts height below a certain height level, a drive-thru, a tunnel, a passageway, or other items. When a dimension-restricted item is encountered, the method includes, at decision 409, determining whether there is a high confidence in the estimated shadow dimension. If there is a high confidence in the estimated shadow dimension, then the method includes, at 413, automatically and proactively warning the vehicle operator that there is a dimension-restricted item ahead in which the estimated vehicle dimension exceeds the maximum dimension requirement. The warning may be in the form of a graphical indication on a navigational display.

Figure 5C:
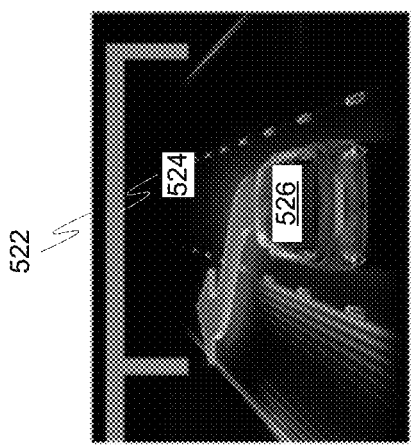
FIGS. 5B-5E are diagrams depicting example graphical indications that could be used to alert a vehicle operator as to whether a dimension-restricted item poses a driving risk, in accordance with various embodiments.
Figure 5E:
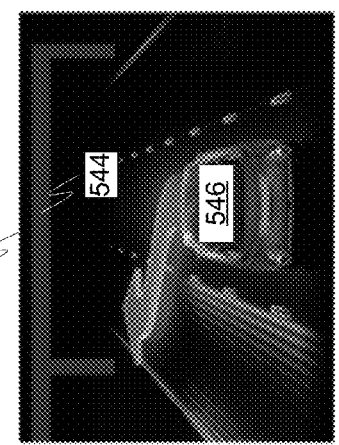
Figure 5B:
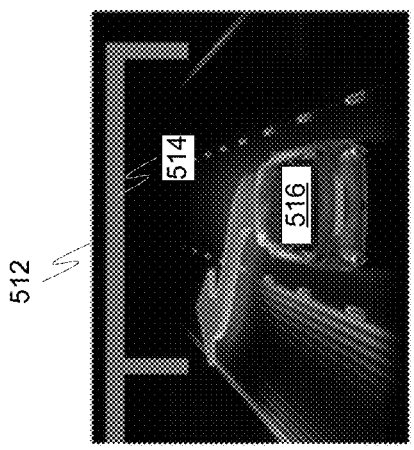
Figure 5D:
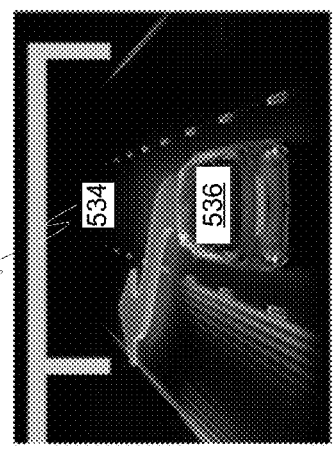
Figure 5A:
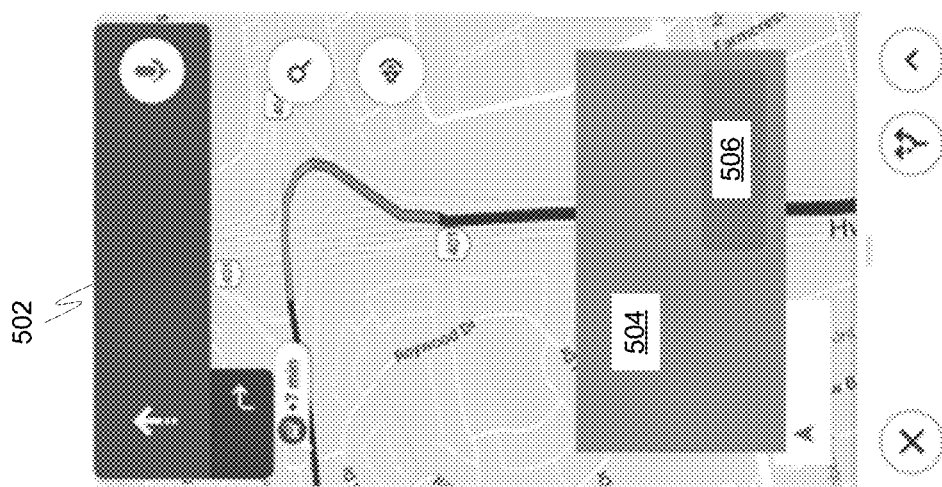
FIG. 5A is a diagram that provides an example graphical indication on a navigational display that could be used to alert a vehicle operator about an upcoming dimension-restricted item having a maximum dimension requirement that is lower than an estimated height of a vehicle and/or trailer, in accordance with an embodiment.

FIG. 5A is a diagram that provides an example graphical indication on a navigational display 502 that could be used to warn a user about an upcoming dimension-restricted item having a maximum dimension requirement that is lower than the estimated dimension of the vehicle plus cargo. In this example, the navigational display 502 includes a dialog box 504 that may provide a message along the lines of "we have detected your vehicle height to be 2 meters and expect there to be obstructions. Re-routing . . . ." The dialog box may also have a button 506 that when actuated allows a user to cancel out of the re-routing due to the detected dimension-restricted item having a maximum height requirement that is lower than the estimated height of the vehicle plus cargo.

Referring back to FIG. 4, the process 400 includes, at operation 410, the host vehicle detecting an upcoming dimension-restricted item based on vision, GPS, or other vehicle sensors. The process 400 includes, at operation 412, automatically determining if the dimension-restricted item poses a problem for the vehicle and, at operation 415, automatically alerting through a visual indication using the HMI that the dimension-restricted item poses an issue for driving.

FIGS. 5B through 5E provide example graphical indications that could be used to alert a vehicle operator that a dimension-restricted item may pose an issue for driving. In the example of FIG. 5B, the graphical indication 512 provides a symbol 514 indicative of a dimension restrictive item in the path of the host vehicle. Also depicted is a symbol 516 representative of the host vehicle. In this example, the symbol 514 indicative of a dimension-restricted item is shown in a color, such as Gray, that is not definitive regarding whether the dimension-restricted item poses a problem. This may occur when there is no dimension estimate for the vehicle or there is a low confidence in the high estimate for the vehicle.

In the example of a FIG. 5C, the graphical indication 522 provides a symbol 524 that is indicative of a dimension-restricted item in the path of the host vehicle. Also depicted is a symbol 526 that is representative of the host vehicle. In this example, the symbol 524 indicates that the dimension-restricted item does not pose a problem by being displayed in a color, such as green, that indicates that the dimension-restricted item does not pose a problem for the host vehicle. This may occur when the dimension estimate is below the maximum dimension for the dimension-restricted item and the confidence level in the dimension estimate is high. This may also occur when the dimension estimate is below the maximum dimension for the dimension-restricted item and the confidence level in the dimension estimate is medium and the difference between the dimension estimate and the maximum dimension is such that even if there is an error in the dimension estimate it still should not pose a problem.

In the example of FIG. 5D, the graphical indication 532 provides a symbol 534 that is indicative of a dimension-restricted item in the path of the host vehicle. Also depicted is a symbol 536 that is representative of the host vehicle. In this example, the symbol 534 indicates that it is possible that the dimension-restricted item may pose a problem. This may occur when there is medium confidence in the dimension estimate and the difference between the dimension estimate and the maximum dimension is within an error range for the dimension estimate.

In the example a FIG. 5E, the graphical indication 542 provides a symbol 544 that is indicative of a dimension-restricted item in the path of the host vehicle. Also depicted is a symbol 546 that is representative of the host vehicle. In this example, the symbol 544 indicates that the dimension-restricted item does pose a problem. This may occur when the dimension estimate is below the maximum dimension for the dimension-restricted item. In this case the vehicle or trailer may be made to visually stand out, such as by highlighting, to show which of the vehicle or trailer is of concern.

Referring back to FIG. 4, the process 400 includes, at operation 414, the operator of the host vehicle optionally opening a vehicle "self-awareness" app, for example in the infotainment system. The "self-awareness" app may cause the display of a graphical indication 417 in the HMI that indicates the state of dimension estimation for the vehicle and/or a trailer.

FIGS. 6A-6B provide example graphical indications that could be used to indicate the state of dimension estimation for the host vehicle and/or a trailer. FIG. 6A depicts an example graphical indication 602 that may be used to indicate an estimated trailer measurement determined based on analyzing shadows. Example graphical indication 602 includes a text box 604 that provides the estimated trailer dimensions, a symbol 606 that is representative of the object (vehicle or trailer) to which the dimensions pertain and displayed in a color (e.g., green for high or orange for medium) that indicates the confidence level for the estimated dimensions, a button 608 for accepting the estimated dimensions, and a button 610 for declining the estimated dimensions. In this example, the symbol 606 is that of a trailer and in the color green to indicate that the estimated dimensions in text box 604 are for a trailer and that the confidence level for the estimate is high. If the estimated dimensions were for the host vehicle plus cargo, then the symbol 606 may have been one of a vehicle (e.g., car or truck).

FIG. 6B depicts an example graphical indication 612 that may be used to indicate an estimated trailer measurement determined based on analyzing shadows. Example graphical indication 612 includes a text box 614 the provides the estimated trailer dimensions, a symbol 616 that is representative of the object (vehicle or trailer) to which the dimensions pertain and displayed in a color (e.g., green for high or orange for medium) that indicates the confidence level for the estimated dimensions, a button 618 for accepting the estimated dimensions, and a button 620 for declining the estimated dimensions. In this example, the symbol 616 is that of a trailer and in the color orange to indicate that the estimated dimensions in text box 614 are for a trailer and that the confidence level for the estimate is medium. A user would have the option to accept the estimated dimensions for use in providing warnings via the accept button 618 or decline the estimated dimensions so that addition estimations could be made to improve the confidence in the estimates via the decline button 620. If the estimated dimensions were for the host vehicle plus cargo, then the symbol 606 may have been one of a vehicle (e.g., car or truck).

Figure 7:
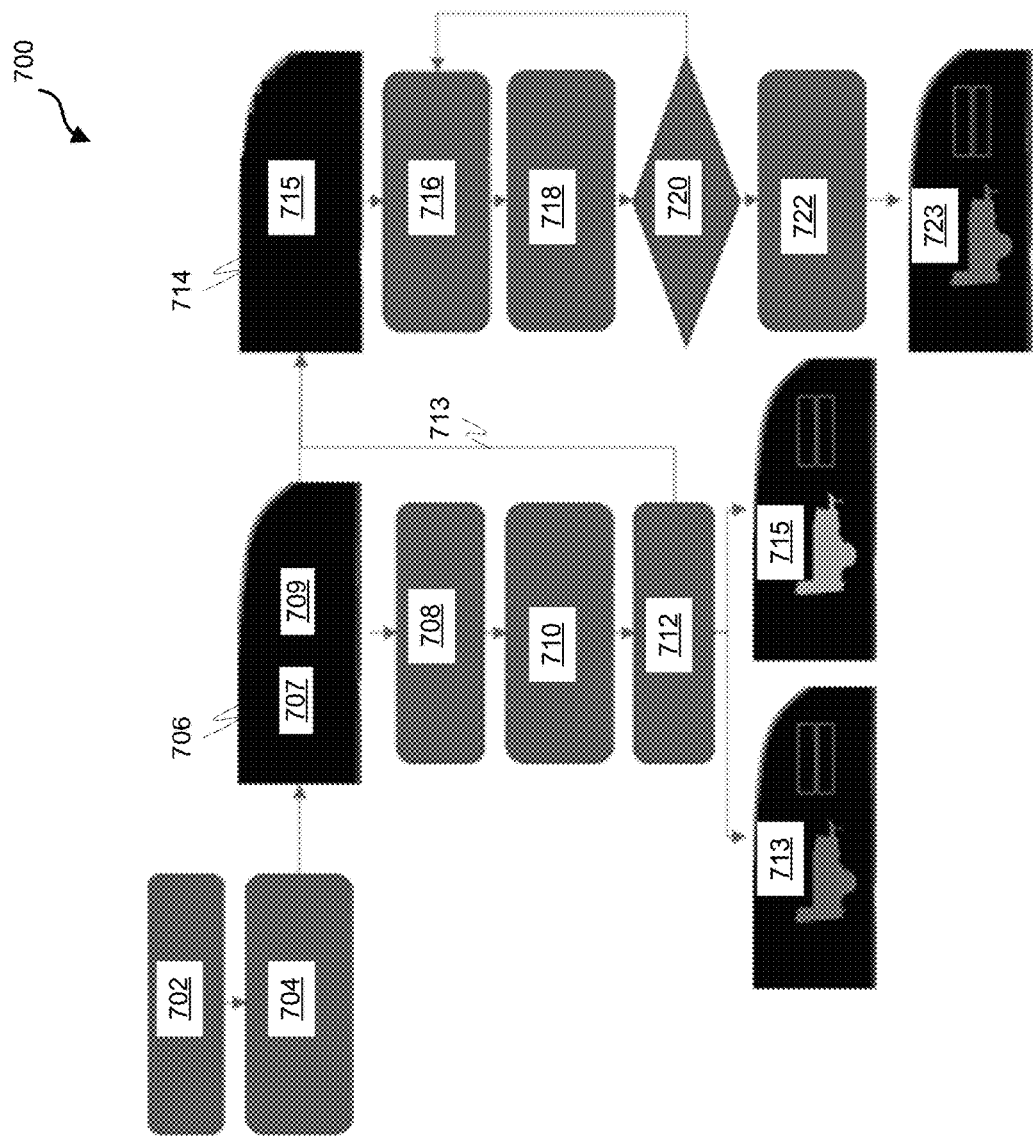
FIG. 7 is a process flow chart depicting another example process for providing alerts via an HMI as a result of calculating a vehicle and/or trailer dimension using shadow information, in accordance with an embodiment.

FIG. 7 is a process flow chart depicting another example process 700 for providing alerts via an HMI as a result of calculating a vehicle and/or trailer dimension using shadow information.

At operation 702, a vehicle operator couples a trailer to the host vehicle. At operation 704, the operator of the host vehicle opens a vehicle "trailering" app, for example in the infotainment system. At operation 706, the trailering app provides a graphical user interface (GUI) in an HMI display. The GUI provides a first widget 707 for selecting auto detection of a trailer dimension using shadow information and a second widget 709 for manual entry of trailer dimension information.

At operation 708, responsive to the vehicle operator selecting the first widget 707 for auto detection of trailer dimension using shadow information the process 700 includes the trailering app requesting the vehicle operator to drive the host vehicle in a prescribed motion. At operation 710, the process 700 includes analyzing shadow information to calculate dimension profile, confidence, and accuracy. The analysis may be performed in accordance with a process described in connection with FIG. 2 and/or FIG. 3. At operation 712, the process 700 includes providing the vehicle operator with a graphical indication of the detected dimension information. The graphical indication indicates the state of dimension estimation for the host vehicle and/or a trailer. When the dimension estimation has a high confidence level, a GUI 713, such as that depicted in FIG. 6A, may be used to indicate an estimated trailer measurement determined based on analyzing shadows. When the dimension estimation has a medium confidence level, a GUI 715, such as that depicted in FIG. 6B, may be used to indicate an estimated trailer measurement determined based on analyzing shadows.

When the vehicle operator declines acceptance of the automatically generated estimated trailer measurement, for example via GUI 713 or GUI 715, or when a dimension estimation is not found at 712, or responsive to selection of second widget 709 for manual entry of trailer dimension information at operation 706, the example process 700 includes at operation 714 providing a GUI for manual entry by the vehicle operator of a vehicle and/or trailer dimension. At operation 716, the example process 700 includes analyzing shadow information to calculate a dimension profile, confidence level, and accuracy. The analysis may be performed in accordance with a process described in connection with FIG. 2 and/or FIG. 3. At operation 718, the process 700 includes checking if the entered dimension is within an allowable range based on comparison with the calculated dimension profile. At decision 720 when the entered dimension is not within an allowable range, the process 700 includes determining whether the confidence level for the estimated dimension based on shadow information is high. If the confidence level is not high (no at decision 720), the process 700 includes returning to operation 716. If the confidence level is high (yes at decision 720), the process 700 includes, at operation 722, warning the vehicle operator that the entered dimension differs from the detected dimension. The process 700 may further include providing a GUI 723, such as that depicted in FIG. 6A, that indicates the detected dimension estimation and that the dimension estimation has a high confidence level.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A dimension calculation system in a host vehicle for dynamically calculating a vehicle dimension using solar shadow information, the dimension calculation system comprising a controller, the controller configured to:
   calculate solar position and an expected vehicle shadow based on geocode location, time, and vehicle dynamics;
   detect one or more actual vehicle shadows in one or more images from vehicle cameras;
   compare the one or more actual vehicle shadows to one or more expected vehicle shadows;
   determine a dimension profile and max height point for a vehicle plus vehicle cargo based on a comparison of one or more actual vehicle shadows to the one or more expected vehicle shadows;
   calculate a confidence level for the dimension profile and max height point for the vehicle plus cargo based on: how many observed shadows are used to determine the dimension profile and max height point, how many different vehicle travel directions are represented by the observed shadows, and magnitude and intensity of the observed shadows; and
   use the dimension profile and max height point to provide one or more dimension notifications when the confidence level for the dimension profile and max height point for the vehicle plus cargo are above a first threshold level.

2. The dimension calculation system of claim 1, wherein the controller is further configured to:
   calculate an expected trailer shadow based on geocode location, time, and vehicle dynamics;
   detect one or more actual trailer shadows in one or more images from vehicle cameras;
   compare the one or more actual trailer shadows to one or more expected trailer shadows;
   determine a dimension profile and max height point for a trailer based on a comparison of one or more actual trailer shadows to the one or more expected trailer shadows;
   calculate a confidence level for the dimension profile and max height point for the trailer; and
   use the dimension profile and max height point for the trailer to provide one or more dimension notifications when the confidence level for the dimension profile and max height point for the trailer are above a second threshold level.

3. The dimension calculation system of claim 2, wherein the controller is further configured to calculate the confidence level for the dimension profile and max height point for the trailer based on: how many observed shadows are used to determine the dimension profile and max height point for the trailer, how many different trailer travel directions are represented by the observed shadows, and magnitude and intensity of the observed shadows.

4. The dimension calculation system of claim 1, wherein to calculate the confidence level for the dimension profile and max height point, the controller is configured to:
   determine a level of illumination from image histogram of an image;
   stretch the image histogram to maximize contrast, wherein histogram stretching involves modifying brightness values of pixels in the image according to a mapping function that specifies an output pixel brightness value for each input pixel brightness value;
   calculate a level of contrast in shadow portions of the image based on the image histogram being stretched;
   repeat the determine a level of illumination, stretch the image histogram, and calculate the level of contrast for a predetermine number of times for a major travel direction;
   calculate a shadow quality measurement comprising a mean and variance for the level of contrast for the major travel direction after the predetermined number of times; and
   determine the shadow quality measurement for each of a plurality of major travel directions the vehicle has driven in, wherein the vehicle confidence level is based on the shadow quality measurement and the directions travelled.

5. The dimension calculation system of claim 1, wherein the controller is further configured to calculate a dimension profile and max height point for a vehicle plus vehicle cargo or a trailer from shadows formed from artificial light.

6. The dimension calculation system of claim 5, wherein to calculate a dimension profile and max height point for a trailer from shadows formed from artificial light the controller is configured to:
   estimate an expected vehicle shadow at a first position;

detect an actual vehicle shadow from artificial light at the first position via image detection operations on an image of the vehicle;

calculate a dimension scaling factor based on a difference between the expected vehicle shadow and the actual vehicle shadow;

retrieve images containing a trailer shadow when the trailer is at the first position;

estimate a dimension profile and max height point for the trailer using the scaling factor;

calculate a confidence level for the dimension profile and max height point for the trailer; and use the dimension profile and max height point for the trailer to provide one or more dimension notifications when the confidence level for the dimension profile and max height point are above a third threshold level.

7. The dimension calculation system of claim 6, wherein the controller is configured to calculate the confidence level for the dimension profile and max height point for the trailer based on: vehicle dynamics, magnitude and intensity of observed shadows, and confidence in vehicle dimensions.

8. The dimension calculation system of claim 7, wherein to calculate the confidence level of the dimension profile and max height point for the trailer, the controller is configured to:

determine a level of illumination from image histogram of an image;

stretch the image histogram to maximize contrast, wherein histogram stretching involves modifying brightness values of pixels in the image according to a mapping function that specifies an output pixel brightness value for each input pixel brightness value; calculate a level of contrast in shadow portions of the image based on the image histogram being stretched;

repeat the determine a level of illumination, stretch the image histogram, and calculate the level of contrast for a predetermine number of times for a major travel direction;

calculate a shadow quality measurement comprising a mean and variance for the level of contrast for the major travel direction after the predetermined number of times; and determine the shadow quality measurement for each of a plurality of major travel directions the vehicle has driven in, wherein the vehicle confidence level is based on the shadow quality measurement and the directions travelled.

9. The dimension calculation system of claim 6, wherein the controller is further configured to calculate the dimension scaling factor based on a difference between a known reference area on the vehicle and its shadow.

10. The dimension calculation system of claim 9, wherein the known reference area comprises a vehicle bumper, vehicle roof, vehicle hood, or vehicle trunk.

11. The dimension calculation system of claim 1, wherein the one or more dimension notifications comprises: a message on a navigational display that provides a message indicating a possible obstruction.

12. The dimension calculation system of claim 1, wherein the one or more dimension notifications comprises a symbol representative of a dimension-restricted item on a graphical user interface (GUI), an indication on the GUI as to whether the dimension-restricted item poses a problem based on the dimension profile and max height point, and wherein the symbol representative of a dimension-restricted item provides an indication as to whether the dimension-restricted item poses a problem based on a color in which the symbol is displayed.

13. The dimension calculation system of claim 1, wherein the one or more dimension notifications comprises a graphical indication that includes a text box that provides estimated dimensions, a symbol that is representative of an object to which the dimensions pertain and displayed in a color that indicates a confidence level for the estimated dimensions, a button for accepting the estimated dimensions, and a button for declining the estimated dimensions.

14. A vehicle comprising:
one or more cameras; and
a controller configured to:
calculate solar position and an expected vehicle shadow based on geocode location, time, and vehicle dynamics;
detect one or more actual vehicle shadows in one or more images from the vehicle cameras;
compare the one or more actual vehicle shadows to one or more expected vehicle shadows;
determine a dimension profile and max height point for a vehicle plus vehicle cargo based on a comparison of one or more actual vehicle shadows to the one or more expected vehicle shadows;
calculate a confidence level for the dimension profile and max height point for the vehicle plus cargo based on: how many observed shadows are used to determine the dimension profile and max height point, how many different vehicle travel directions are represented by the observed shadows, and magnitude and intensity of the observed shadows; and
use the dimension profile and max height point to provide one or more dimension notifications when the confidence level for the dimension profile and max height point for the vehicle plus cargo are above a first threshold level.

15. The vehicle of claim 14, wherein the controller is further configured to:
calculate an expected trailer shadow based on geocode location, time, and vehicle dynamics;
detect one or more actual trailer shadows in one or more images from vehicle cameras;
compare the one or more actual trailer shadows to one or more expected trailer shadows;
determine a dimension profile and max height point for a trailer based on a comparison of one or more actual trailer shadows to the one or more expected trailer shadows;
calculate a confidence level for the dimension profile and max height point for the trailer; and
use the dimension profile and max height point for the trailer to provide one or more dimension notifications when the confidence level for the dimension profile and max height point for the trailer are above a second threshold level.

16. The vehicle of claim 14, wherein the controller is further configured to:
estimate an expected vehicle shadow at a first position;
detect an actual vehicle shadow from artificial light at the first position via image detection operations on an image of the vehicle;
calculate a dimension scaling factor based on a difference between the expected vehicle shadow and the actual vehicle shadow;
retrieve images containing a trailer shadow when the trailer is at the first position;

estimate a dimension profile and max height point for the trailer using the scaling factor;

calculate a confidence level for the dimension profile and max height point for the trailer; and use the dimension profile and max height point for the trailer to provide one or more dimension notifications when the confidence level for the dimension profile and max height point are above a third threshold level.

17. A method in a vehicle, comprising:

calculating solar position and an expected vehicle shadow based on geocode location, time, and vehicle dynamics;

detecting one or more actual vehicle shadows in one or more images from vehicle cameras;

comparing the one or more actual vehicle shadows to one or more expected vehicle shadows;

determining a dimension profile and max height point for a vehicle plus vehicle cargo based on a comparison of one or more actual vehicle shadows to the one or more expected vehicle shadows;

calculating a confidence level for the dimension profile and max height point for the vehicle plus cargo based on: how many observed shadows are used to determine the dimension profile and max height point, how many different vehicle travel directions are represented by the observed shadows, and magnitude and intensity of the observed shadows; and using the dimension profile and max height point to provide one or more dimension notifications when the confidence level for the dimension profile and max height point for the vehicle plus cargo are above a first threshold level.

18. The method of claim 17, further comprising:

calculating an expected trailer shadow based on geocode location, time, and vehicle dynamics;

detecting one or more actual trailer shadows in one or more images from vehicle cameras;

comparing the one or more actual trailer shadows to one or more expected trailer shadows;

determining a dimension profile and max height point for a trailer based on a comparison of one or more actual trailer shadows to the one or more expected trailer shadows;

calculating a confidence level for the dimension profile and max height point for the trailer; and using the dimension profile and max height point for the trailer to provide one or more dimension notifications when the confidence level for the dimension profile and max height point for the trailer are above a second threshold level.

19. The method of claim 17, further comprising:

estimating an expected vehicle shadow at a first position;

detecting an actual vehicle shadow from artificial light at the first position via image detection operations on an image of the vehicle;

calculating a dimension scaling factor based on a difference between the expected vehicle shadow and the actual vehicle shadow;

retrieving images containing a trailer shadow when the trailer is at the first position;

estimating a dimension profile and max height point for the trailer using the scaling factor;

calculating a confidence level for the dimension profile and max height point for the trailer; and using the dimension profile and max height point for the trailer to provide one or more dimension notifications when the confidence level for the dimension profile and max height point are above a third threshold level.

20. The method of claim 17, wherein calculating the confidence level for the dimension profile and max height point for the vehicle plus cargo comprises:

determining a level of illumination from image histogram of an image;

stretching the image histogram to maximize contrast, wherein histogram stretching involves modifying brightness values of pixels in the image according to a mapping function that specifies an output pixel brightness value for each input pixel brightness value;

calculating a level of contrast in shadow portions of the image based on the image histogram being stretched;

repeating the determine a level of illumination, stretch the image histogram, and calculate the level of contrast for a predetermine number of times for a major travel direction;

calculating a shadow quality measurement comprising a mean and variance for the level of contrast for the major travel direction after the predetermined number of times; and determining the shadow quality measurement for each of a plurality of major travel directions the vehicle has driven in, wherein the vehicle confidence level is based on the shadow quality measurement and the directions travelled.

* * * * *